United States Patent
Tomihisa

(10) Patent No.: US 10,599,374 B2
(45) Date of Patent: Mar. 24, 2020

(54) PRINTING METHOD THAT ENSURES SECURITY OF PRINTED MATTER, STORAGE MEDIUM, AND MOBILE TERMINAL

(71) Applicant: CANON KABUSHIKI KAISHA, Tokyo (JP)

(72) Inventor: Taishi Tomihisa, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/233,190

(22) Filed: Aug. 10, 2016

(65) Prior Publication Data

US 2017/0060503 A1 Mar. 2, 2017

(30) Foreign Application Priority Data

Aug. 26, 2015 (JP) ................. 2015-166812

(51) Int. Cl.
| | | |
|---|---|---|
| *H04N 1/04* | (2006.01) | |
| *G06F 3/12* | (2006.01) | |
| *H04N 1/44* | (2006.01) | |
| *H04N 1/00* | (2006.01) | |

(Continued)

(52) U.S. Cl.
CPC .......... *G06F 3/1238* (2013.01); *G06F 3/1222* (2013.01); *G06F 3/1292* (2013.01); *H04N 1/00034* (2013.01); *H04N 1/00307* (2013.01); *H04N 1/00411* (2013.01); *H04N 1/4406* (2013.01); *H04W 4/025* (2013.01); *H04W 4/027* (2013.01); *H04W 4/80* (2018.02); *H04N 2201/0094* (2013.01)

(58) Field of Classification Search
CPC ............. H04N 1/4406; H04N 1/00411; H04N 1/00034; H04N 1/00307
USPC ....................... 358/1.14, 1.15, 1.9
See application file for complete search history.

(56) References Cited

U.S. PATENT DOCUMENTS

2013/0086638 A1* 4/2013 Itogawa .................. G06F 21/34
726/4
2013/0329253 A1* 12/2013 Sasaki .................. H04N 1/0035
358/1.15

(Continued)

FOREIGN PATENT DOCUMENTS

| JP | 2009234106 A | 10/2009 |
|---|---|---|
| JP | 2012212330 A | 11/2012 |

(Continued)

OTHER PUBLICATIONS

Office Action issued in Japanese Application No. 2015-166812 dated Feb. 5, 2019.

*Primary Examiner* — Henok Shiferaw
(74) *Attorney, Agent, or Firm* — Rossi, Kimms & McDowell LLP

(57) ABSTRACT

A printing method that ensures security of printed matter. A printing apparatus performs printing based on print data transmitted from a mobile terminal which a user operates. A distance between the mobile terminal and the printing apparatus is measured, and based on the measured distance, acceptance of an instruction to perform the printing from the user is restricted. When the measured distance is equal to or greater than a threshold value set in advance, acceptance of an instruction to perform the printing from the user is not permitted.

16 Claims, 8 Drawing Sheets

(51) Int. Cl.
*H04W 4/02* (2018.01)
*H04W 4/80* (2018.01)

(56) References Cited

U.S. PATENT DOCUMENTS

| | | | |
|---|---|---|---|
| 2014/0126010 A1* | 5/2014 | Rocas | G06F 3/01 |
| | | | 358/1.15 |
| 2014/0240756 A1* | 8/2014 | Ganesan | H04W 4/029 |
| | | | 358/1.15 |
| 2014/0253949 A1* | 9/2014 | Tsujimoto | H04N 1/0084 |
| | | | 358/1.14 |
| 2014/0253965 A1* | 9/2014 | Asai | G06F 3/1205 |
| | | | 358/1.15 |
| 2015/0187152 A1* | 7/2015 | Matsushima | G06F 21/35 |
| | | | 340/5.61 |
| 2016/0255218 A1* | 9/2016 | Takahashi | H04N 1/00323 |
| | | | 358/1.15 |
| 2017/0060503 A1* | 3/2017 | Tomihisa | G06F 3/1238 |
| 2017/0134609 A1* | 5/2017 | Park | H04N 1/00278 |

FOREIGN PATENT DOCUMENTS

| | | |
|---|---|---|
| JP | 2014146205 A | 8/2014 |
| JP | 2015023305 A | 2/2015 |

\* cited by examiner

PRINTING METHOD THAT ENSURES SECURITY OF PRINTED MATTER, STORAGE MEDIUM, AND MOBILE TERMINAL

BACKGROUND OF THE INVENTION

Field of the Invention

The present invention relates to a printing method, a storage medium, and a mobile terminal, and in particular to a printing method to carry out a reservation printing process, a storage medium, and a mobile terminal.

Description of the Related Art

There is known an MFP (multi function printer) which is a printing apparatus that receives print data for use in a printing process from a client PC or the like and carries out a printing process based on the received print data. The MFP carries out a normal printing process in which it immediately carries out a printing process based on received print data, and in addition, a reservation printing process in which it temporarily stores received print data in a server capable of data communications and reserves a printing process based on the print data. In the reservation printing process, when a user issues an instruction to start printing using an operating panel provided in the MFP, the MFP obtains print data from the server and carries out a printing process based on the obtained print data. On the operating panel, information on a list of print data stored in the server, a variety of setting information on the print data, and so forth are displayed, and a user selects desired print data from the displayed list information and sets a variety of setting information on the selected print data. Upon detecting that a user has come near the MFP, the MFP obtains, for example, a variety of setting information on print data, which is displayed on the operating panel, from the server (see, for example, Japanese Laid-Open Patent Publication (Kokai) No. 2009-234106).

Lately, in a reservation printing process, it is possible to perform the same operations using a mobile terminal such as a smart phone which a user has as well as the operating panel of the MFP so as to enhance user convenience. In the mobile terminal, an operation menu for performing a variety of operations is displayed, and the operation menu includes a setting menu for print data and a print start button for issuing an instruction to start execution of a printing process based on the print data. This enables a user to set, for example, a variety of setting information on print data or issue an instruction to start printing without using the operating panel of the MFP.

With the mobile terminal described above, however, printing undesired by a user may be started due to an erroneous operation on the print start button by the user. Also, a user is allowed to perform operation even at a place away from the MFP, and hence even when the user is at a place where he or she cannot immediately take out printed matter, the printed matter may stay on a discharged-sheet tray or the like of the MFP after being discharged onto it. Other users may steal a glance at classified information printed on the staying printed matter, and also, other users may take the printed matter away. Namely, the conventional printing method cannot ensure security of printed matter.

SUMMARY OF THE INVENTION

The present invention provides a printing method that ensures security of printed matter, a storage medium, and a mobile terminal.

Accordingly, the present invention provides a printing method in which a printing apparatus performs printing based on print data transmitted from a mobile terminal which a user operates, comprising a measurement step of measuring a distance between the mobile terminal and the printing apparatus, and a restricting step of, based on the measured distance, restricting acceptance of an instruction to perform the printing from the user, wherein in the restricting step, when the measured distance is equal to or greater than a threshold value set in advance, acceptance of an instruction to perform the printing from the user is not permitted.

According to the present invention, security of printed matter is ensured.

Further features of the present invention will become apparent from the following description of exemplary embodiments (with reference to the attached drawings).

DESCRIPTION OF THE EMBODIMENTS

Hereafter, an embodiment according to the present invention will be described in detail with reference to the drawings.

In the following description of the present embodiment, it is assumed that the present invention is applied to an MFP which is a printing apparatus that performs reservation printing, but the present invention should not always be applied to the MFP and may be applied to any printing apparatuses as long as they are capable of performing reservation printing. Examples of printing apparatuses capable of performing reservation printing include an SFP (single function printer) and an LBP (laser beam printer).

Figure 1:
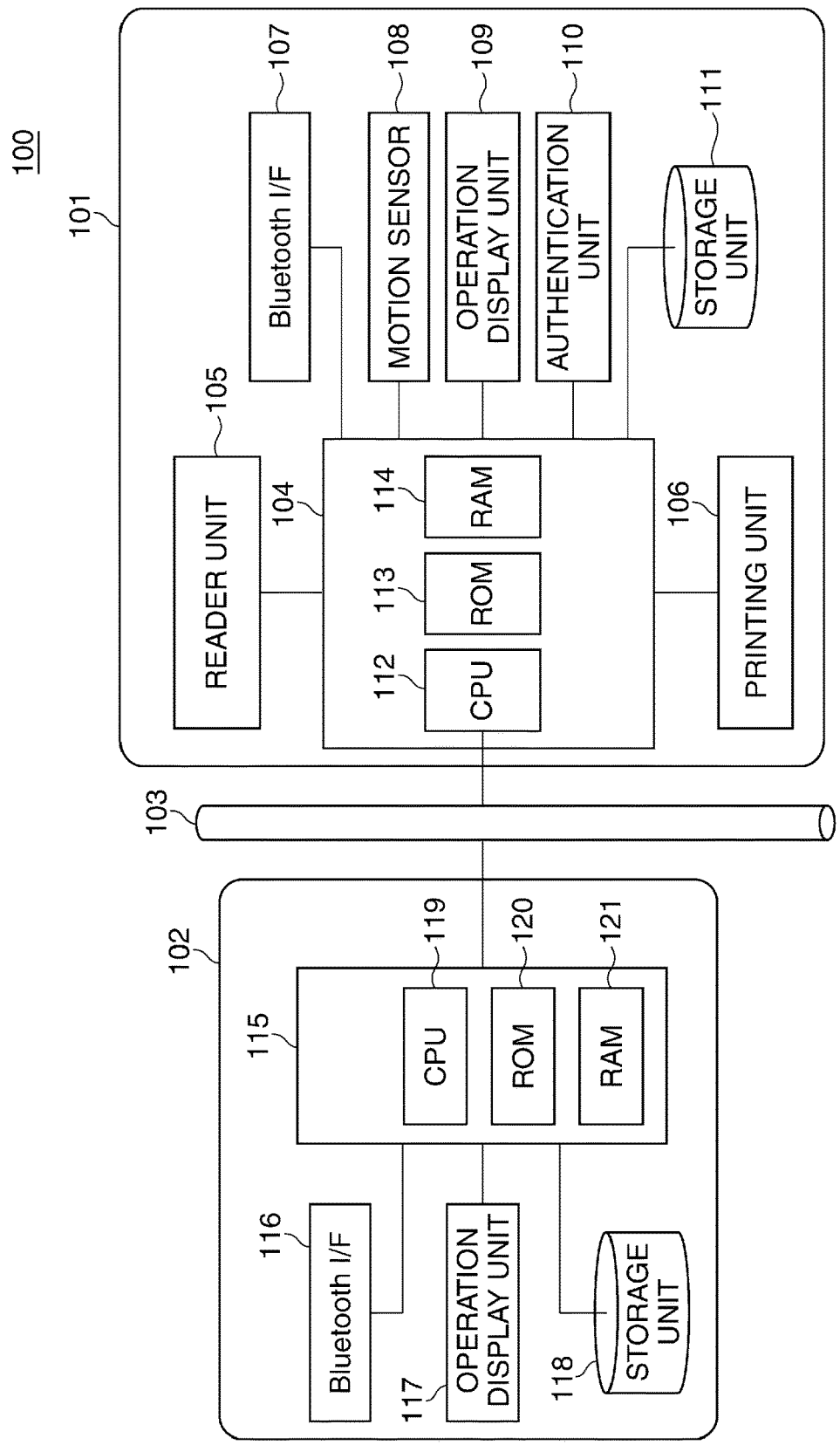
FIG. 1 is a block diagram schematically showing an arrangement of a printing system including an MFP according to an embodiment of the present invention.

FIG. 1 is a block diagram schematically showing an arrangement of a printing system 100 including an MFP 101 according to the embodiment of the present invention.

Referring to FIG. 1, the printing system 100 has the MFP 101 and a mobile terminal 102, and the MFP 101 and the mobile terminal 102 are connected together via a LAN 103. The MFP 101 has a control unit 104, a reader unit 105, a printing unit 106, a Bluetooth I/F 107, a motion sensor 108, an operation display unit 109, an authentication unit 110, and a storage unit 111. The control unit 104 is connected to each of the following: the reader unit 105, the printing unit 106, the Bluetooth I/F 107, the motion sensor 108, the operation display unit 109, the authentication unit 110, and the storage unit 111. The control unit 104 also has a CPU 112, a ROM 113, and a RAM 114. The mobile terminal 102 has a control unit 115, a Bluetooth I/F 116, an operation display unit 117, and a storage unit 118, and the control unit 115 is connected to each of the following: the Bluetooth I/F 116, the operation display unit 117, and the storage unit 118. The control unit 115 has a CPU 119, a ROM 120, and a RAM 121.

The MFP 101 carries out a normal printing process and a reservation printing process based on print data for use in a printing process. In the reservation printing process, upon receiving print data from a client PC or the like, not shown, the MFP 101 temporarily stores the received print data in the storage unit 111 or a server or the like, not shown. After that, when instructed to start execution of a printing process by a user, the MFP 101 obtains print data from the storage unit 111 or the server or the like, not shown, and carries out a printing process based on the obtained print data. In the present embodiment, it is assumed, for example, that received print data is stored in the storage unit 111. The control unit 104 centrally controls the component elements connected to thereto, i.e. the reader unit 105, the printing unit 106, the Bluetooth I/F 107, the motion sensor 108, the operation display unit 109, the authentication unit 110, and the storage unit 111. The CPU 112 provides a variety of control by executing various programs stored in the ROM 113. The RAM 114 is used as a work area for the CPU 112 and a temporary storage area for a variety of data. The reader unit 105 carries out a process to read image data off an original placed on an original platen glass, not shown. The printing unit 106 prints image data on sheets, which are recording sheets, based on received print data.

The Bluetooth I/F 107 carries out data communications with a variety of devices, which are capable of carrying out wireless communications using Bluetooth including, for example, BLE (Bluetooth low energy), such as the mobile terminal 102 through the wireless communication. The Bluetooth I/F 107 also transmits identification information, which identifies the MFP 101, as a beacon signal at regular time intervals. This enables, for example, the mobile terminal 102 to identify the MFP 101 as a device capable of carrying out the wireless communications based on the transmitted beacon signal. The motion sensor 108 detects whether or not there is a person around the MFP 101 using ultrasound, infrared radiation, or the like and sends a result of the detection to the control unit 104. The operation display unit 109 has various types of operating keys and a liquid crystal panel of a touch-panel type, which are not shown in the figure. The various types of operating keys are for a user to configure settings on a variety of processes which are carried out by the MFP 101. A setting screen for configuring settings on a variety of processes carried out by the MFP 101, setting buttons for setting a variety of setting information, and so forth are displayed on the liquid crystal panel. In the present embodiment, through user's operation on the operation display unit 109, the MFP 101 is instructed to start execution of a printing process and also instructed to change a variety of setting information included in print data stored in the MFP 101 (hereafter referred to as "print setting information"). The authentication unit 110 performs user authentication based on user information, which is obtained from an ID card or the like and identifies a user, and sends a result of the user authentication to the control unit 104. The storage unit 111 stores a variety of data. In the present embodiment, the storage unit 111 stores print data transmitted from a client PC, a server, or the like, not shown, and setting-changed print data, to be described later, transmitted from the mobile terminal 102.

The mobile terminal 102 is a smart phone, a tablet PC, a laptop PC, or the like, and is able to perform a variety of operations relating to a printing process which is carried out by the MFP 101. For example, by operating the mobile terminal 102, a user is allowed to issue an instruction to start execution of a printing process based on each piece of print data stored in the MFP 101 and issue an instruction to change print setting information. Namely, in the present embodiment, a variety of operations relating to a printing process are allowed to be performed through the mobile terminal 102 as well as the operation display unit 109 of the MFP 101. The control unit 115 centrally controls the component elements connected to thereto, i.e. the Bluetooth I/F 116, the operation display unit 117, and the storage unit 118. The CPU 119 provides a variety of control by executing various programs stored in the ROM 120. The RAM 121 is used as a work area for the CPU 119 and as a temporary storage area for a variety of data. The Bluetooth I/F 116 carries out data communications with a variety of devices, which are capable of carrying out wireless communications using Bluetooth including, for example, BLE through the wireless communications.

The operation display unit 117 has a liquid crystal panel of a touch-panel type, not shown. A variety of images are displayed on the liquid crystal panel. For example, a print data selection screen 500 in FIG. 5A, to be described later, which enables selection of print data stored in the MFP 101 is displayed on the operation display unit 117. The storage unit 118 stores a variety of data.

Figure 2:
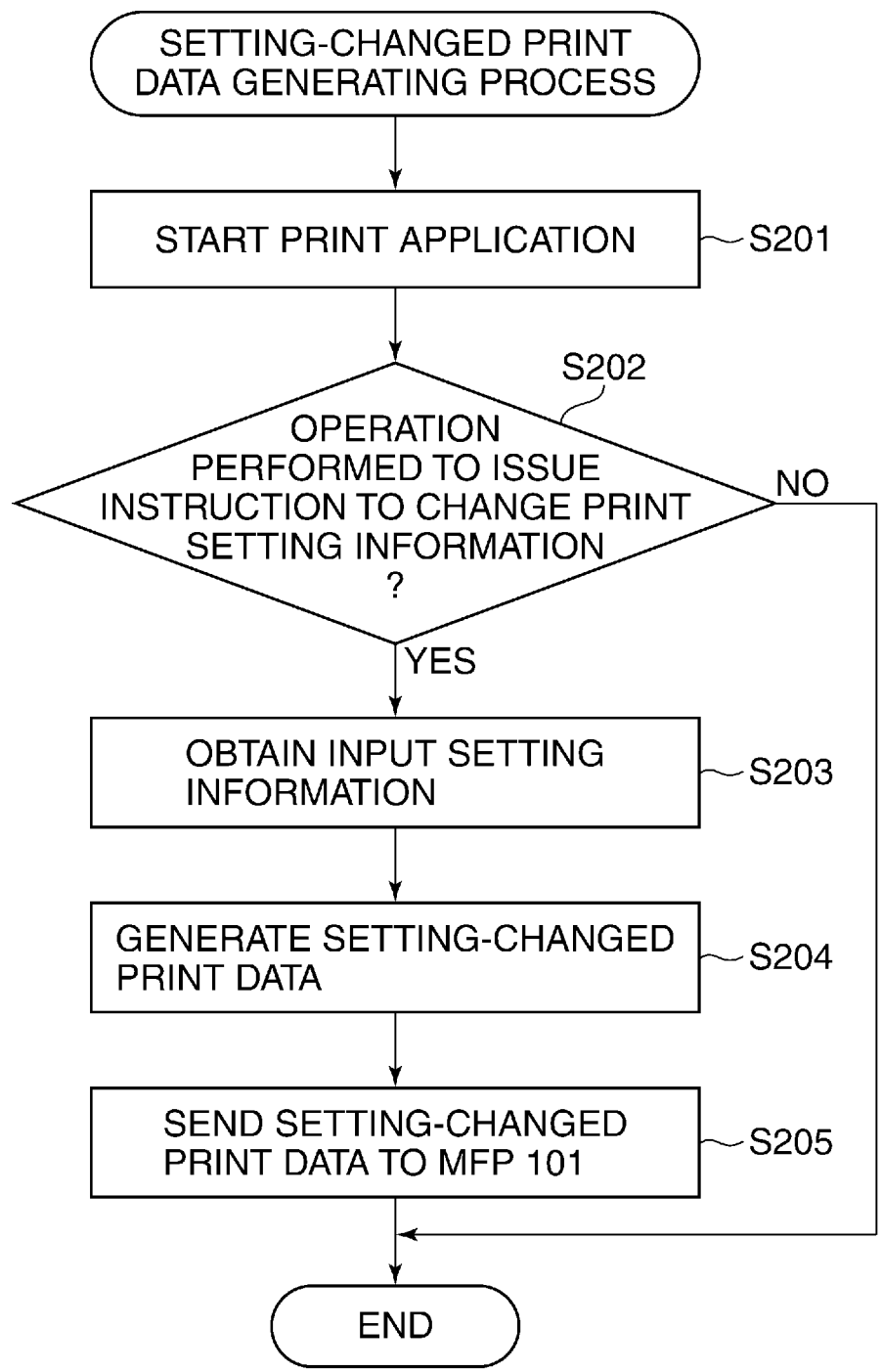
FIG. 2 is a flowchart showing the procedure of a setting-changed print data generating process which is carried out by a mobile terminal in FIG. 1.

FIG. 2 is a flowchart showing the procedure of a setting-changed print data generating process which is carried out by the mobile terminal 102 in FIG. 1.

The process in FIG. 2 is carried out by the CPU 119 of the mobile terminal 102 executing various programs stored in the ROM 120.

Referring to FIG. 2, first, when a user inputs user information which identifies the user, for example, a user ID to a user authentication screen displayed on the operation display unit 117, the CPU 119 performs user authentication based on the input user ID. When the user authentication is successful, the CPU 119 determines that the user who has input the user ID is a user authorized to operate the MFP 101. Next, the CPU 119 starts a print application for performing a variety of operations relating to a printing process which is carried out by the MFP 101 (step S201). When the print application is started, the print data selection screen 500 in FIG. 5A, to be described later, is displayed on the operation display unit 117. This enables the user to instruct the MFP 101 to perform a printing process and change print setting information by operating the print data selection screen 500. Then, the CPU 119 determines whether or not an operation that issues an instruction to change print setting information has been performed by the user (step S202). In the step S202, for example, when a setting change button 503 included in the print data setting screen 500, to be described later, is depressed, the CPU 119 determines that an operation that issues an instruction to change print setting information has been performed by the user. On the other hand, when the setting change button 503 is not depressed, the CPU 119 determines that an operation that issues an instruction to change print setting information has not been performed by the user.

As a result of the determination in the step S202, an operation that issues an instruction to change print setting information has been performed by the user, the CPU 119 carries out a print data changing process in steps S203 to S205. Specifically, the CPU 119 obtains setting information input through operation on the operation display unit 117 (step S203) and generates print data with print setting information changed based on the obtained setting information (hereafter referred to as "setting-changed print data") (step S204). The setting-changed print data includes user information which identifies the user who has performed the operation that issues an instruction to change setting information (hereafter referred to as "change instructing user information"). The CPU 119 then transmits the generated setting-changed print data to the MFP 101 (step S205) and ends the present process.

As a result of the determination in the step S202, an operation that issues an instruction to change print setting information has not been performed by the user, the CPU 119 ends the present process.

Figure 3:
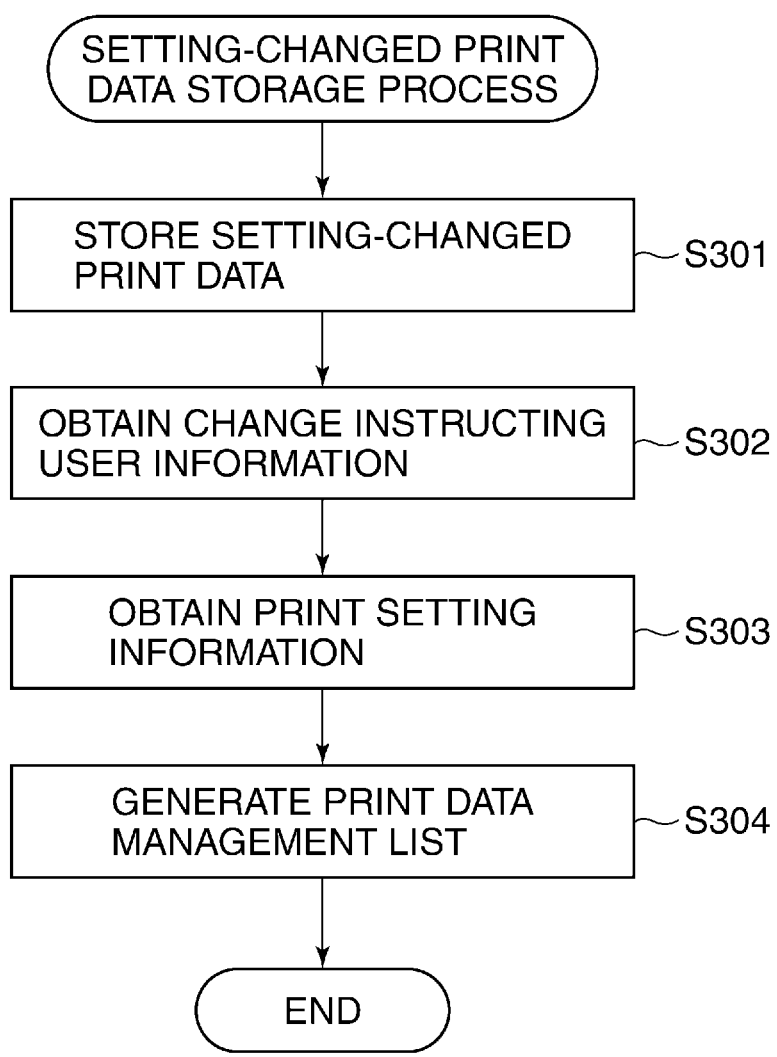
FIG. 3 is a flowchart showing the procedure of a setting-changed print data storage process which is carried out by the MFP in FIG. 1.

FIG. 3 is a flowchart showing the procedure of a setting-changed print data storage process which is carried out by the MFP 101 in FIG. 1.

The process in FIG. 3 is carried out by the CPU 112 of the MFP 101 executing various programs stored in the ROM 113.

Referring to FIG. 3, first, the CPU 112 receives setting-changed print data transmitted from the mobile terminal 102 in the step S205 and stores the received setting-changed print data in the storage unit 111 (step S301). Next, the CPU 112 obtains change instructing user information from the setting-changed print data (step S302) and obtains print setting information from the setting-changed print data (step S303). Then, the CPU 112 generates a print data management list for managing print data based on the obtained change instructing user information and various setting information (step S304) and stores the print data management list in the storage unit 111. The print data management list is information on a list of print data stored in the storage unit 111 and classified by user. When the print data management list has already been stored in the storage unit 111, the CPU 112 adds information on new print data to the stored print data management list. The CPU 112 carries out the process in the step S304 and then ends the present process.

Figure 4:
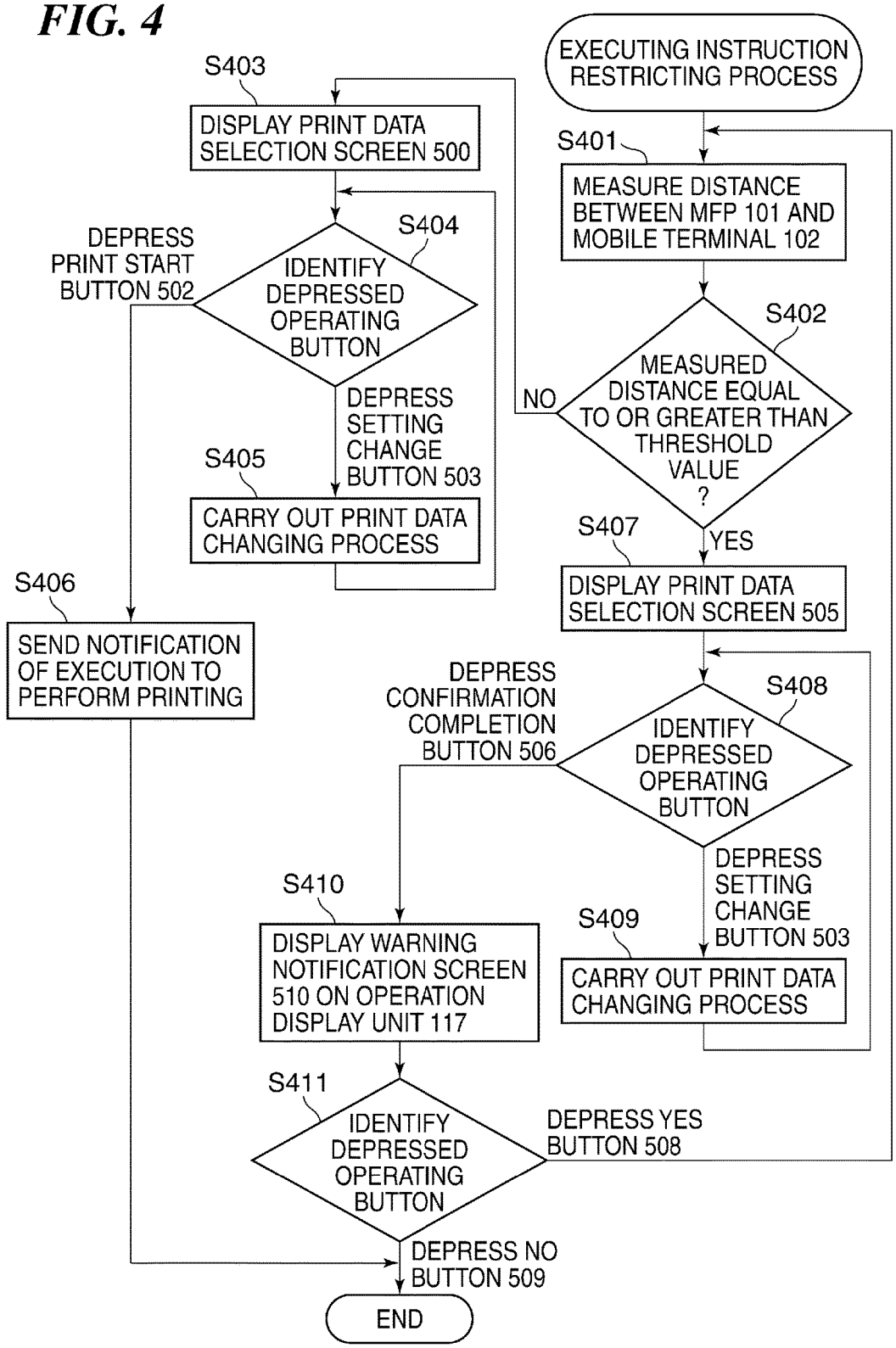
FIG. 4 is a flowchart showing the procedure of an executing instruction restricting process which is carried out by the mobile terminal in FIG. 1.

FIG. 4 is a flowchart showing the procedure of an executing instruction restricting process which is carried out by the mobile terminal 102 in FIG. 1.

The process in FIG. 4 is carried out by the CPU 119 of the mobile terminal 102 executing various programs, which are stored in the ROM 120, and on the precondition that a user has already been successfully authenticated, and a print application has already been started.

Here, as described above, printing undesired by a user may be started due to an erroneous operation on the operation display unit 117 of the mobile terminal 102 by the user. Also, a user is allowed to perform operation even at a place away from the MFP 101, and hence even when the user is at a place where he or she cannot take out printed matter, the printed matter may stay on a discharged-sheet tray, not shown, of the MFP 101 after being discharged onto the discharged-sheet tray. Other users may steal a glance at classified information printed on the staying printed matter, and also, other users may take the printed matter away. Namely, the conventional printing method cannot ensure security of printed matter.

To cope with this, in the present embodiment, a distance between the MFP 101 and the mobile terminal 102 is measured, and when the measured distance is equal to or greater than a threshold value set in advance, acceptance of an operation that issues an instruction to start execution of a printing process is not permitted.

Referring to FIG. 4, first, upon receiving a beacon signal transmitted from the MFP 101 at regular time intervals, the CPU 119 measures a distance between the MFP 101 and the mobile terminal 102 based on the received beacon signal (step S401) (measurement step). The distance between the MFP 101 and the mobile terminal 102 is measured based on, for example, a radio field intensity of a beacon signal transmitted using BLE. A beacon signal includes radio field intensity information indicative of an intensity of a radio wave transmitted by the MFP 101. The CPU 119 measures a radio field intensity of the received beacon signal, and based on a difference between the measured radio field intensity and radio field intensity information included in the beacon signal, measures the distance between the MFP 101 and the mobile terminal 102. Next, the CPU 119 determines whether or not the measured distance is equal to or greater than a threshold value set in advance (step S402). The threshold value is set in advance in the mobile terminal 102 based on a distance at which a user who holds the mobile terminal 102 is able to immediately take out printed matter produced by the MFP 101. It is preferred that the threshold value is 5 m to 10 m.

Figure 5A:
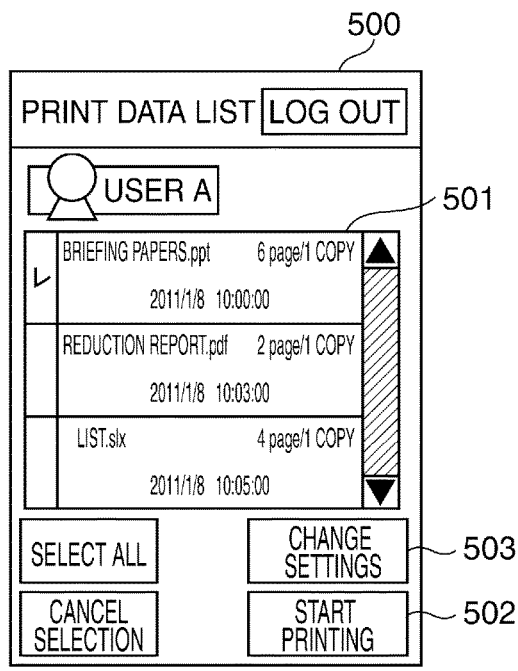
FIGS. 5A to 5D are views showing examples of various screens displayed on an operation display unit in FIG. 1, FIG. 5A showing a print data selection screen, FIG. 5B showing a setting change screen, FIG. 5C showing a print data selection screen, and FIG. 5D showing a warning notification screen.
Figure 5B:
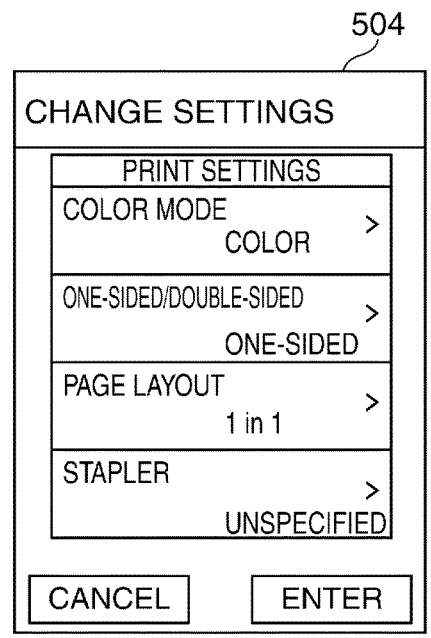

As a result of the determination in the step S402, when the measured distance is smaller than the threshold value set in advance, the CPU 119 displays the print data selection screen 500 in FIG. 5A on the operation display unit 117 (step S403). The print data selection screen 500 includes list information 501, a print start button 502 (execution start button), and the setting change button 503. The list information 501 indicates information on a list of print data based on a print data management list generated in the step S304 in FIG. 3. The print start button 502 is an operating button for instructing the MFP 101 to start execution of a printing process, and the setting change button 503 is an operating button for instructing the MFP 101 to change print setting information. When a user selects desired print data from the list information 501 and depresses the print start button 502, an executing instruction notification that instructs the MFP 101 to start execution of a printing process based on the selected print data is transmitted from the mobile terminal 102 to the MFP 101. When the user selects desired print data from the list information 501 and depresses the setting change button 503, a setting change screen 504 in FIG. 5B is displayed, and print setting information is changed through operation on the setting change screen 504. Then, on the print data selection screen 500, the CPU 119 identifies a depressed one of the print start button 502 and the setting change button 503 (step S404).

Upon identifying the setting change button 503 as a depressed operating button in the step S404, the CPU 119 carries out the same process as the print data changing process in FIG. 2 (steps S203 to S205) (step S405), followed by the process returning to the step S404.

Upon identifying the print start button 502 as a depressed operating button in the step S404, the CPU 119 transmits an executing instruction notification, which notifies an instruction to execute a printing process based on the selected print data, to the MFP 101 (step S406). Upon receiving the executing instruction notification from the mobile terminal 102, the MFP 101 carries out a printing process according to the executing instruction notification. After carrying out the process in the step S406, the CPU 119 ends the present process.

Figure 5C:
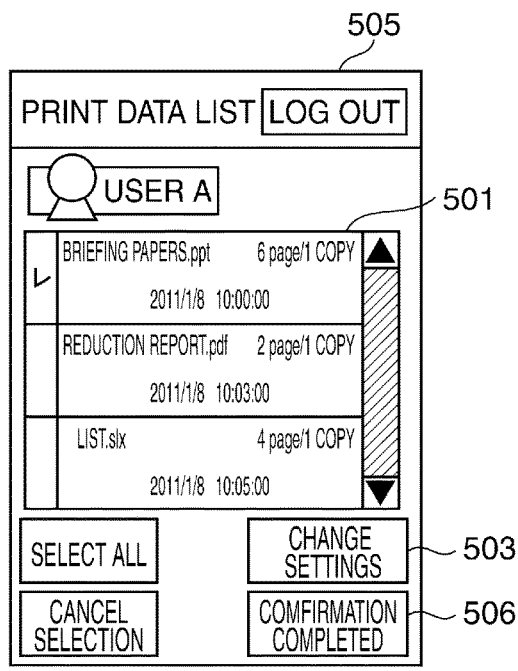

As a result of the determination in the step S402, when the measured distance is equal to or greater than the threshold value set in advance, the CPU 119 displays a print data selection screen 505 in FIG. 5C on the operation display unit 117 (step S407). The print data selection screen 505 includes a confirmation completion button 506 as well as the list information 501 and the setting change button 503. The confirmation completion button 506 is an operating button for issuing an instruction to perform a remeasurement of a distance between the MFP 101 and the mobile terminal 102. Namely, in the present embodiment, when the measured distance is equal to or greater than the threshold value set in advance, the CPU 119 does not permit acceptance of an operation that issues an instruction to start execution of a printing process from a user and does not display the print start button 502 on the operation display unit 117 of the mobile terminal 102. Moreover, in the present embodiment, the setting change button 503 is displayed on the operation display unit 117 irrespective of a measured distance, and by operating the mobile terminal 102, a user is allowed to change print setting information even at a place away from the MFP 101. Then, on the print data selection screen 505, the CPU 119 identifies a depressed one of the setting change button 503 and the confirmation completion button 506 (step S408).

Upon identifying the setting change button 503 as a depressed operating button in the step S408, the CPU 119 carries out the same process as the print data changing process in FIG. 2 (steps S203 to S205) (step S409), followed by the process returning to the step S408.

Figure 5D:
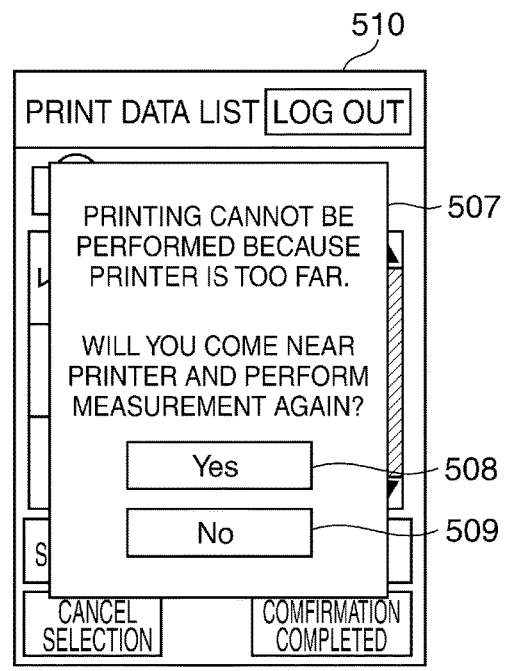

Upon identifying the confirmation completion button 506 as a depressed operating button in the step S408, the CPU 119 displays a warning notification screen 510 in FIG. 5D on the operation display unit 117 (step S410) (display step). The warning notification screen 510 includes an operation setting menu 507, which includes a notification that acceptance of an operation that issues an instruction to start execution of a printing process is restricted, a YES button 508, and a NO button 509. The YES button 508 is an operating button for issuing an instruction to start remeasurement of a distance between the MFP 101 and the mobile terminal 102. The NO button 509 is an operating button for issuing an instruction not to perform a remeasurement of a distance between the MFP 101 and the mobile terminal 102. Then, on the operation setting menu 507 displayed on the operation display unit 117, the CPU 119 identifies a depressed one of the YES button 508 and the NO button 509 (step S411).

When the CPU 119 identifies the YES button 508 as a depressed operating button in the step S411, the process returns to the step S401. On the other hand, when identifying the NO button 509 as a depressed operating button in the step S411, the CPU 119 ends the present process.

According to the processes in FIGS. 2 to 4 described above, a distance between the MFP 101 and the mobile terminal 102 is measured, and when the measured distance is equal to or greater than the threshold value set in advance, acceptance of an operation that issues an instruction to start execution of a printing process from a user is not permitted. Here, when the distance between the MFP 101 and the mobile terminal 102 is equal to or greater than the threshold value set in advance, a user who is operating the mobile terminal 102 is at a predetermined distance or longer from the MFP 101, the user cannot immediately take out printed matter produced according to his or her instruction to carry out a printing process. In this case, other users may take the printed mater away. However, when the measured distance is equal to or greater than the threshold value set in advance, the print start button 502 is not displayed on the operation display unit 117, and hence a printing process is not carried out based on a user's operation that issues an instruction to start execution of a printing process. Namely, it is possible to prevent other users from taking printed matter away and thus ensure security of the printed matter.

Moreover, in the processes in FIGS. 2 to 4 described above, when the measured distance is equal to or greater than the threshold value set in advance, the operation setting menu 507 including a notification that acceptance of an operation that issues an instruction to start execution of a printing process is restricted is displayed on the operation display unit 117. This enables a user to reliably know that he or she is away from the MFP 101 and thus cannot start execution of a printing process by operating the mobile terminal 102.

In the processes in FIGS. 2 to 4 described above, it is possible to change print setting information through user's operation on the operation display unit 117 irrespective of the measured distance. As a result, even when a user is at a predetermined distance or longer from the MFP 101, it is possible to change print setting information through user's operation on the mobile terminal 102, and hence as for changing of print setting information, user convenience is enhanced.

Although the present invention has been described by way of the embodiments, the present invention should not be limited to the embodiments described above.

For example, in the process in FIG. 4, a measurement of a distance between the MFP 101 and the mobile terminal 102 (step S401) may be performed after user's operation on the operation display unit 117.

Figure 6:
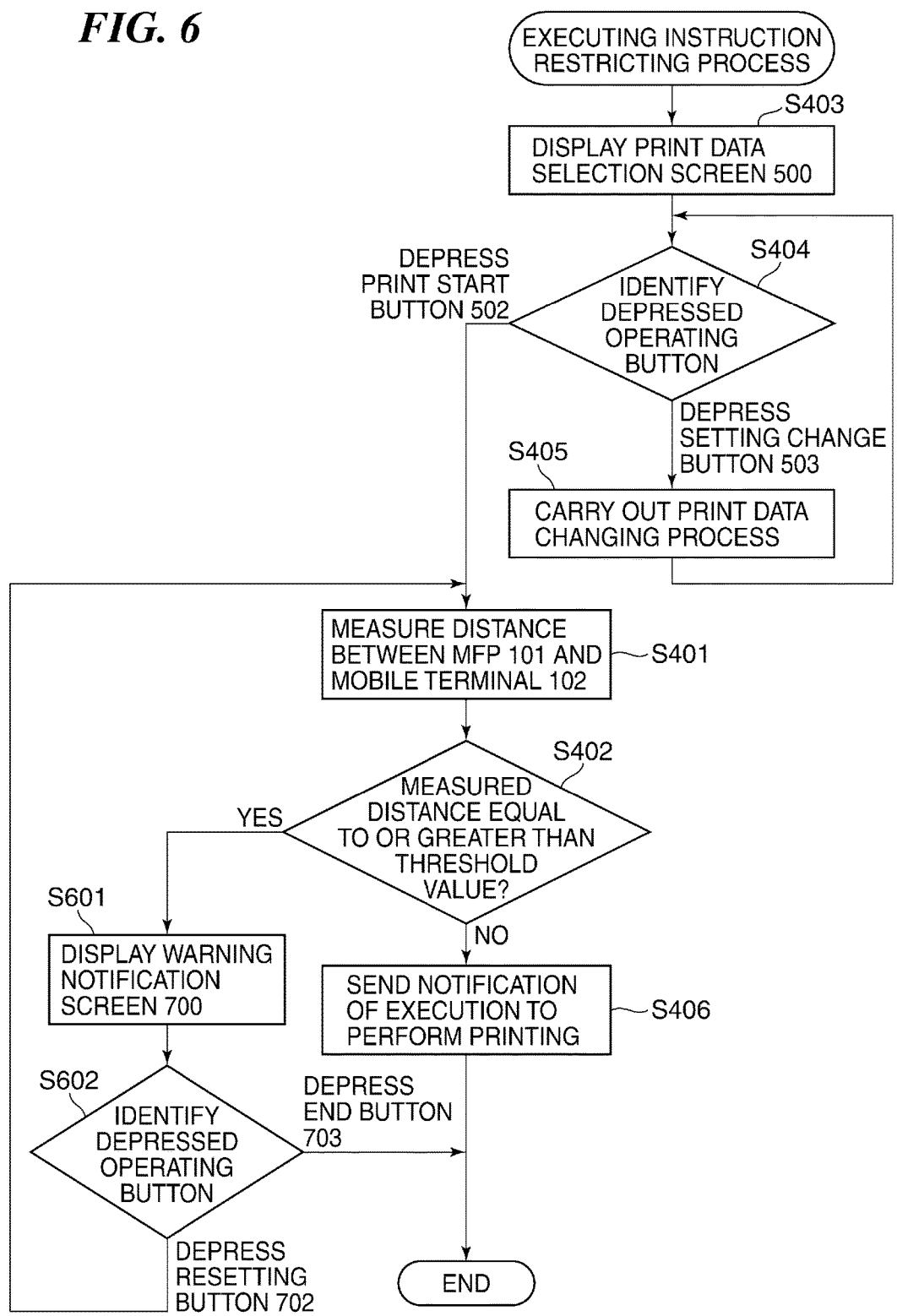
FIG. 6 is a flowchart showing the procedure of a first variation of the executing instruction restricting process in FIG. 4.

FIG. 6 is a flowchart showing the procedure of a first variation of the executing instruction restricting process in FIG. 4.

The process in FIG. 6 is carried out by the CPU 119 of the mobile terminal 102 executing various programs, which are stored in the ROM 120, and on the precondition that a user has already been successfully authenticated, and a print application has already been started.

Referring to FIG. 6, first, the CPU 119 carries out the same processes as those in the steps S403 and S404 in FIG. 4.

Upon identifying the setting change button 503 as a depressed operating button in the step S404, the CPU 119 carries out the same process as that in the step S405. On the other hand, upon identifying the print start button 502 as a depressed operating button in the step S404, the CPU 119 carries out the same processes as those in the steps S401 and S402 in FIG. 4.

Figure 7A:
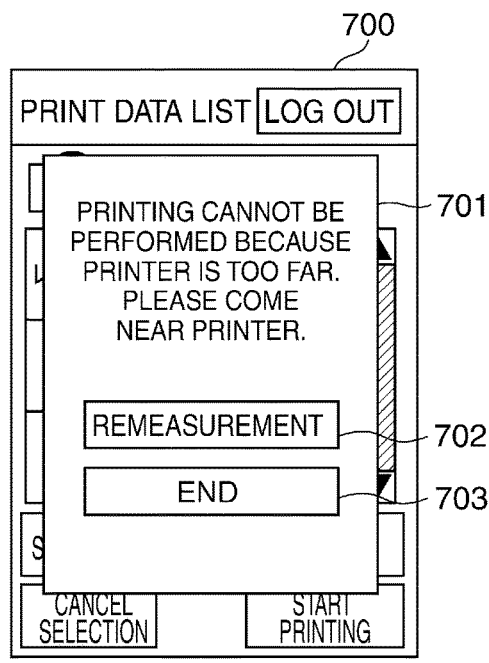
FIGS. 7A to 7C are views showing examples of the warning notification screen displayed on the operation display unit in FIG. 1.

As a result of the determination in the step S402, when the measured distance is smaller than the threshold value set in advance, the CPU 119 carries out the same process as that in the step S406 in FIG. 4, and then ends the present process. On the other hand, as a result of the determination in the step S402, when the measured distance is equal to or greater than the threshold value set in advance, the CPU 119 displays a warning notification screen 700 in FIG. 7A on the operation display unit 117 (step S601). The warning notification screen 700 includes an operation setting menu 701, which includes a notification that acceptance of an operation that issues an instruction to start execution of a printing process is restricted, a notification that prompts a user to come near the MFP 101, a remeasurement button 702, and an end button 703. The remeasurement button 702 is an operating button for issuing an instruction to start remeasurement of a distance between the MFP 101 and the mobile terminal 102. The end button 703 is an operating button for canceling issuance of an instruction to start execution of a printing process to the MFP 101. Then, on the operation setting menu 701, the CPU 119 identifies a depressed one of the remeasurement button 702 and the end button 703 (step S602).

When the CPU 119 identifies the remeasurement button 702 as a depressed operating button in the step S602, the process returns to the step S401. On the other hand, when identifying the end button 703 as a depressed operating button in the step S602, the CPU 119 ends the present process.

In the process in FIG. 6 described above as well, the same effects as those in the processes in FIGS. 2 to 4 are obtained.

In the present embodiment, the threshold value set in advance may be changed if there is no person around the MFP 101.

Figure 8:
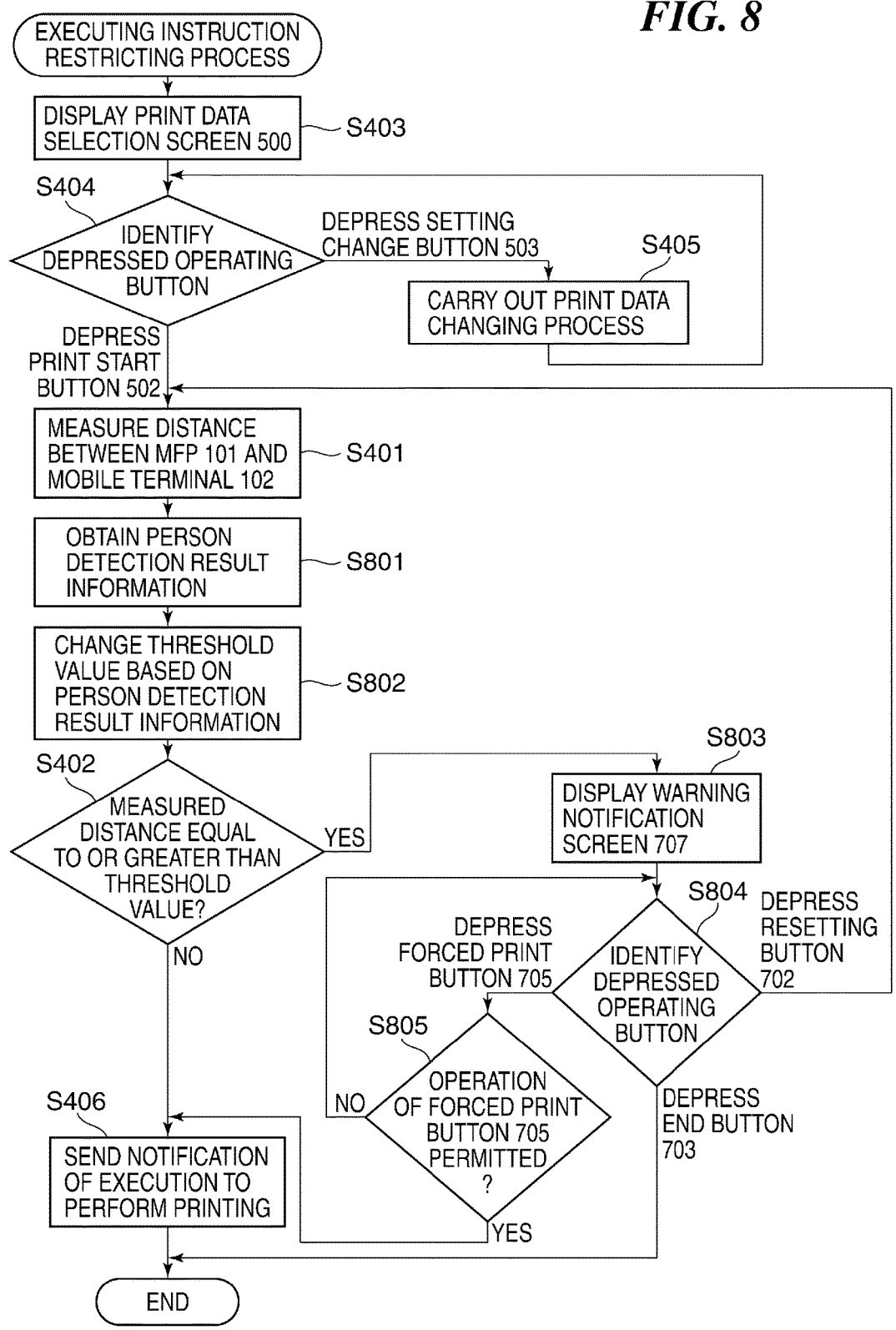
FIG. 8 is a flowchart showing the procedure of a second variation of the executing instruction restricting process in FIG. 4.

FIG. 8 is a flowchart showing the procedure of a second variation of the executing instruction restricting process in FIG. 4.

The process in FIG. 8 is carried out by the CPU 119 of the mobile terminal 102 executing various programs, which are stored in the ROM 120, and on the precondition that a user has already been successfully authenticated, and a print application has already been started.

Referring to FIG. 8, first, the CPU 119 carries out the same processes as those in the steps S403 to S401 in FIG. 6. Next, the CPU 119 obtains person detection result information (determination information), which is indicative of whether or not there is a person around the MFP 101, from the MFP 101 (step S801). The MFP 101 uses the motion sensor 108 to detect whether or not there is a person around the MFP 101 at regular time intervals and transmits detection results to the mobile terminal 102. Then, based on the obtained person detection result information, the CPU 119 changes a threshold value set in advance (step S802) (threshold value changing step). In the step S802, for example, when there is no person around the MFP 101, a threshold value set in advance is changed to a greater value so as not to needlessly restrict acceptance of an operation that issues an instruction to start execution of a printing process from a user. After that, the CPU 119 carries out the same process as that in the step S402 in FIG. 6.

Figure 7B:
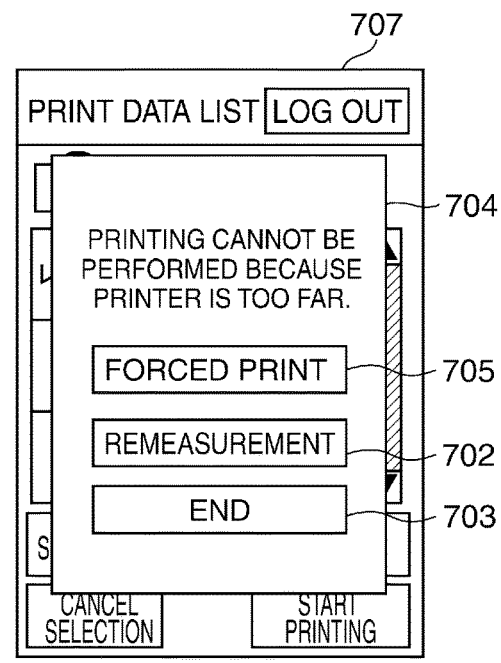
Figure 7C:
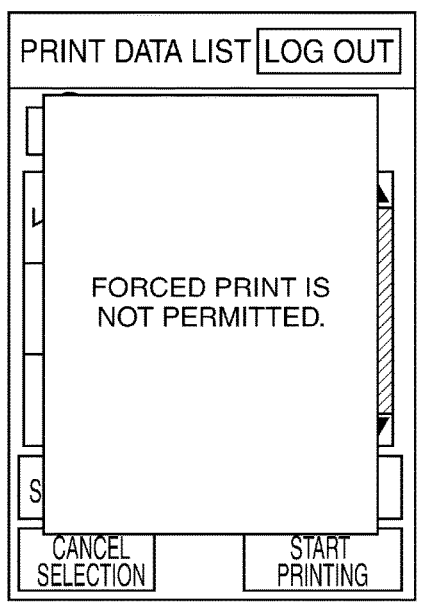

As a result of the determination in the step S402, when the measured distance is smaller than the changed threshold value, the CPU 119 carries out the same process as that in the step S406 in FIG. 4 and ends the present recess. On the other hand, as a result of the determination in the step S402, when the measured distance is equal to or greater than the changed threshold value, the CPU 119 displays a warning notification screen 707 in FIG. 7B on the operation display unit 117 (step S803). The warning notification screen 707 includes an operation setting menu 704. The operation setting menu 704 includes a notification that acceptance of an operation that issues an instruction to start execution of a printing process is restricted, the remeasurement button 702 and the end button 703 included in the operation setting menu 701, and in addition, a forced print button 705. The forced print button 705 is an operating button for forcing the MFP 101 to start execution of a printing process irrespective of a distance between the MFP 101 and the mobile terminal 102. Then, on the operation setting menu 704, the CPU 119 identifies a depressed one of the remeasurement button 702, the end button 703, and the forced print button 705 (step S804).

When the CPU 119 identifies the remeasurement button 702 as a depressed operating button in the step S804, the process returns to the step S401. On the other hand, when identifying the end button 703 as a depressed operating button in the step S804, the CPU 119 ends the present process.

When identifying the forced print button 705 as a depressed operating button in the step S804, the CPU 119 obtains new person detection result information from the MFP 101. After that, based on the obtained new person detection result information, the CPU 119 determines whether or not to permit operation of the forced print button 705 (step S805). In the step S805, when, for example, it is found from the new person detection result information that there is no person around the MFP 101, the CPU 119 determines that operation of the forced print button 705 is to be permitted. On the other hand, when it is found from the new person detection result information that there is a person around the MFP 101, the CPU 119 determines that operation of the forced print button 705 is not to be permitted.

When the CPU 119 determines in the step S805 that operation of the forced print button 705 is to be permitted, the process proceeds to the step S406 and the subsequent steps. Namely, in the present embodiment, when the forced print button 705 is depressed in a case where there is no person around the MFP 101, a user is allowed to instruct the MFP 101 to start execution of a printing process by operating the mobile terminal 102 irrespective of a distance between the MFP 101 and the mobile terminal 102.

As a result of the determination in the step S805, when operation of the forced print button 705 is not permitted, the CPU 119 displays, on the operation display unit 117, a message saying that operation of the forced print button 705 is not to be permitted, followed by the process returning to the step S803.

In the process in FIG. 8 described above, whether or not there is any person around the MFP 101 is determined, and when it is found that there is no person around the MFP 101, a threshold value set in advance is changed to a greater value, or operation of the forced print button 705 is permitted irrespective of a measured distance. As a result, when security of printed matter is naturally ensured due to the absence of a person around the MFP 101, it is possible to prevent user convenience from being decreased by needlessly restricting acceptance of an operation that issues an instruction to start execution of a printing process from a user.

In the present embodiment, print data may include information indicative of a security level of the print data, and a distance corresponding to the security level may be set as a threshold value. For example, a threshold value for print data with a higher security level than a threshold value for print data with a low security level is set at a small value. Thus, for printing of print data with a low security level, user convenience is given priority, whereas for printing of print data with a high security level, ensuring of security is given a high priority. Namely, it is possible to enhance user convenience and ensure security at the same time according to a security level of print data.

Moreover, in the present embodiment, a distance between the MFP 101 and the mobile terminal 102 may be measured based on a beacon signal transmitted by wireless communication using Wi-Fi, or a distance between the MFP 101 and the mobile terminal 102 may be measured using ultrasound.

In the process in FIG. 8 according to the present embodiment, whether or not there is a person around the MFP 101 may be determined based on footage from a camera, not shown, provided in the MFP 101.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-166812, filed Aug. 26, 2015 which is hereby incorporated by reference herein in its entirety.

What is claimed is:

1. A printing method in which a printing apparatus performs printing of print data stored in the printing apparatus in accordance with a print instruction transmitted from a mobile terminal which a user operates, the printing method comprising:
   a determination step of determining whether a distance between the mobile terminal and the printing apparatus is equal to or smaller than a predetermined distance;
   a display control step of, irrespective of a result of the determination in said determination step, obtaining from the printing apparatus list information indicating print data corresponding to the user of the mobile terminal and displaying a selection screen for selecting desired print data based on the obtained list information;
   a control step of not transmitting the print instruction for printing the desired print data selected via the selection screen in a case where it is determined that the distance between the mobile terminal and the printing apparatus is not equal to or not smaller than the predetermined distance in said determination step; and
   a transmission step of transmitting to the printing apparatus a printing instruction for performing printing of the selected print data in accordance with acceptance of the user's instruction from the user who attempts to perform the printing by selecting the desired print data via the selection screen in a case where it is determined that the distance between the mobile terminal and the printing apparatus is equal to or smaller than the predetermined distance in said determination step.

2. The printing method according to claim 1, wherein the print instruction is transmitted in accordance with reception of a user's operation for selecting an execution start button that is displayed on the selection screen in said display control step, and
   in said control step, in a case where it is determined that the distance between the mobile terminal and the printing apparatus is not equal to or not smaller than the predetermined distance in said determination step, the execution start button is controlled to not displayed on the selection screen.

3. The printing method according to claim 1, further comprising:
   a second transmission step of transmitting to the printing apparatus, a change instruction for instructing a change of a setting of the selected print data in accordance with acceptance of the user's another instruction for changing the setting of the print data selected via the selection screen irrespective of the result of the determination in said determination step.

4. The printing method according to claim 1, wherein the print data includes information indicative of a security level of the print data, and
   a distance corresponding to the security level is set as the threshold value.

5. The printing method according to claim 1, wherein the selection screen further includes an execution start button, and
   in said control step, in a case where it is determined that the distance between the mobile terminal and the printing apparatus is not equal to or not smaller than the predetermined distance in said determination step, the print instruction is controlled not to be transmitted to the printing apparatus even if a user's operation for selecting the execution start button is accepted.

6. A printing method in which a printing apparatus performs printing of print data stored in the printing apparatus or an external apparatus in accordance with a print instruction transmitted from a mobile terminal which a user operates, the printing method comprising:
   a measurement step of measuring a distance between the mobile terminal and the printing apparatus;
   a control step of, when the measured distance is equal to or greater than a threshold value set in advance, not transmitting the print instruction for printing print data selected via a selection screen;
   a determination step of determining whether around the printing apparatus, there is another user different from the user; and
   a threshold value changing step of, when there is no other user around the printing apparatus, changing the threshold value set in advance to a greater value.

7. The printing method according to claim 5, wherein when there is no other user around the printing apparatus, transmission of the print instruction is permitted irrespective of the measured distance in said restriction step. terminal and the printing apparatus is equal to or smaller than the predetermined distance in said determination step.

8. A mobile terminal that transmits a print instruction for printing print data stored in a printing apparatus to the printing apparatus in response to an operation by a user, the mobile terminal comprising:
- a determination unit configured to determine whether a distance between the mobile terminal and the printing apparatus is equal to or smaller than a predetermined distance;
- a display control unit configured to, irrespective of a result of the determination by said determination unit, obtain from the printing apparatus list information indicating print data corresponding to the user of the mobile terminal and display a selection screen for selecting desired print data based on the obtained list information;
- a control unit configured to not transmit the print instruction for printing the desired print data selected via the selection screen in a case where it is determined that the distance between the mobile terminal and the printing apparatus is not equal to or not smaller than the predetermined distance by the determination unit; and
- a transmission unit configured to transmit to the printing apparatus a printing instruction for performing printing of the selected print data in accordance with acceptance of the user's instruction from the user who attempts to perform the printing by selecting the desired print data via the selection screen in a case where it is determined that the distance between the mobile.

9. The mobile terminal according to claim 8, wherein the print instruction is transmitted in accordance with reception of a user's operation for selecting an execution start button that is displayed by said display control unit, and
- said control unit controls the execution start button to not be displayed on the selection screen in a case where it is determined that the distance between the mobile terminal and the printing apparatus is not equal to or not smaller than the predetermined distance by the determination unit.

10. The mobile terminal according to claim 8, further comprising:
- a second transmission unit configured to transmit to the printing apparatus, a change instruction for instructing change of a setting of the selected print data in accordance with acceptance of the user's another instruction for changing the setting of the print data selected via the selection screen irrespective of the result of determination by said determination unit.

11. The mobile terminal according to claim 8, wherein the print data includes information indicative of a security level of the print data, and
- a distance corresponding to the security level is set as the threshold value.

12. The mobile terminal according to claim 10, wherein the selection screen further includes an execution start button, and
- in a case where it is determined that the distance between the mobile terminal and the printing apparatus is not equal to or not smaller than the predetermined distance by the determination unit, said control unit controls the print instruction not to be transmitted to the printing apparatus even if a user's operation for selecting the execution start button is accepted.

13. A non-transitory computer-readable storage medium storing a program for causing a computer to execute a printing method in which a printing apparatus performs printing of print data stored in the printing apparatus in accordance with a print instruction transmitted from a mobile terminal which a user operates, the printing method comprising:
- a determination step of determining whether a distance between the mobile terminal and the printing apparatus is equal to or smaller than a predetermined distance;
- a display control step of, irrespective of a result of the determination in said determination step, obtaining from the printing apparatus list information indicating print data corresponding to the user of the mobile terminal and displaying a selection screen for selecting desired print data based on the obtained list information;
- a control step of not transmitting the print instruction for printing the desired print data selected via the selection screen in a case where it is determined that the distance between the mobile terminal and the printing apparatus is not equal to or not smaller than the predetermined distance in said determination step; and
- a transmission step of transmitting to the printing apparatus a printing instruction for performing printing of the selected print data in accordance with acceptance of the user's instruction from the user who attempts to perform the printing by selecting the desired print data via the selection screen in a case where it is determined that the distance between the mobile terminal and the printing apparatus is equal to or smaller than the predetermined distance by the determination unit.

14. A mobile terminal that transmits a print instruction for printing print data stored in a printing apparatus or an external apparatus to the printing apparatus in response to an operation by a user, the mobile terminal comprising:
- a measurement unit configured to measure a distance to the printing apparatus;
- a control unit configured to, when the measured distance is equal to or greater than a threshold value set in advance, not transmit the print instruction for printing print data selected via a selection screen;
- an obtaining unit configured to obtain determination information indicative of whether around the printing apparatus, there is another user different from the user; and
- a threshold value changing unit configured to, when there is no other user around the printing apparatus, change the threshold value set in advance to a greater value.

15. The mobile terminal according to claim 12, wherein when there is no other user around the printing apparatus, said control unit permits transmission of the print instruction irrespective of the measured distance.

16. A non-transitory computer-readable storage medium storing a program for causing a computer to execute a printing method in which a printing apparatus performs printing of print data stored in the printing apparatus or an external apparatus in accordance with a print instruction transmitted from a mobile terminal which a user operates, the printing method comprising:
- a measurement step of measuring a distance between the mobile terminal and the printing apparatus;
- a control step of, when the measured distance is equal to or greater than a threshold value set in advance, not transmitting the print instruction for printing print data selected via a selection screen;
- a determination step of determining whether around the printing apparatus, there is another user different from the user; and a threshold value changing step of, when there is no other user around the printing apparatus, changing the threshold value set in advance to a greater value.

* * * * *